UNITED STATES PATENT OFFICE.

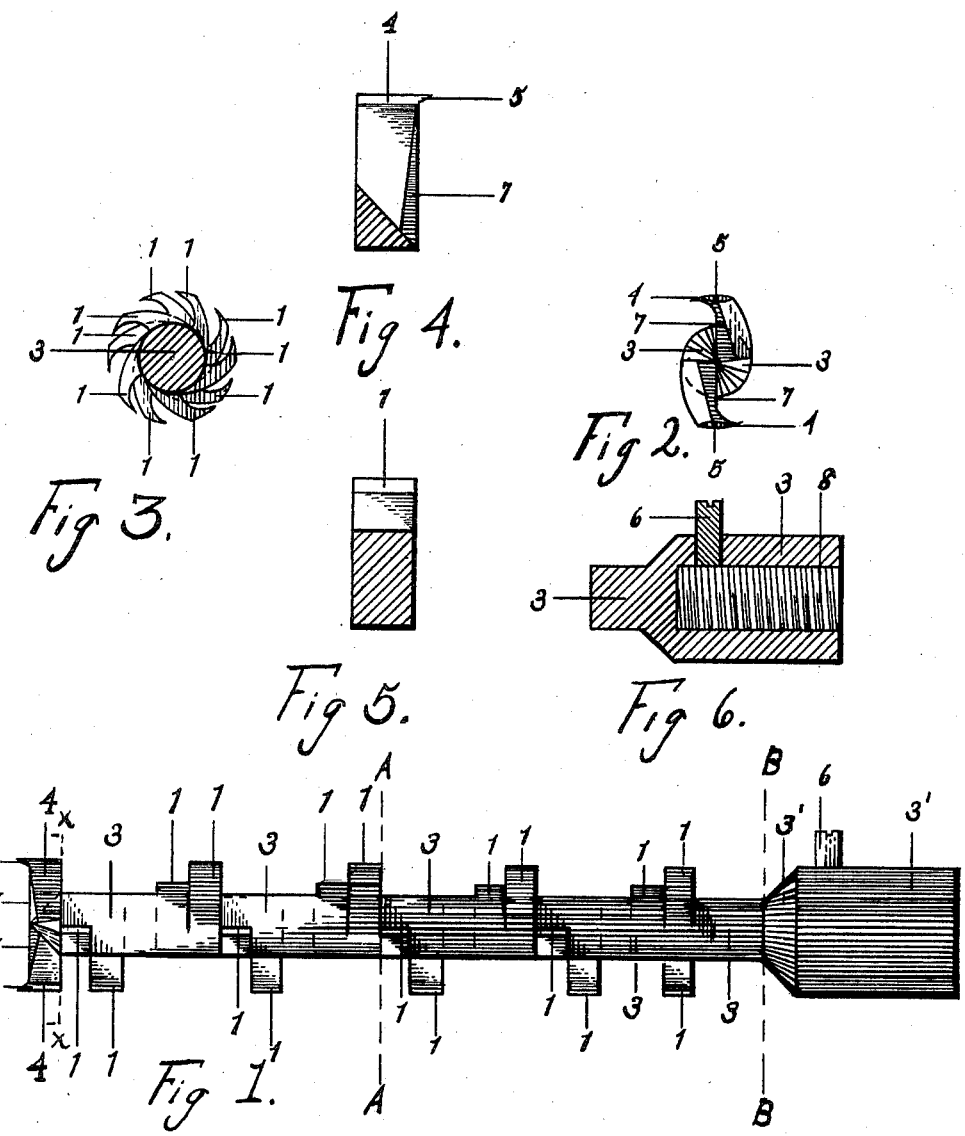

ORLANDO CRANK, OF SALT LAKE CITY, UTAH.

MORTISING-AUGER.

1,038,727. Specification of Letters Patent. Patented Sept. 17, 1912.

Application filed April 30, 1912. Serial No. 694,234.

*To all whom it may concern:*

Be it known that I, ORLANDO CRANK, a citizen of the United States, residing at Salt Lake City, in the county of Salt Lake and State of Utah, have invented certain new and useful Improvements in Mortising-Augers, of which the following is a specification.

My invention relates to an auger bit and has for its object to provide a bit with which to bore a circular hole and that will readily clean itself, and also to enlarge said hole in lateral directions and thereby to bore a mortise. These objects I accomplish with the device illustrated in the accompanying drawings in which similar letters of reference indicate like parts throughout the several figures.

Figure 1 is an elevation of my bit. Fig. 2 is an end elevation of the two cutting blades on the end. Fig. 3 is an end view of a section of my bit between line A A and B B of Fig. 1. Fig. 4 is a side view of the cutting blade on the end of the bit, having parts in section. Fig. 5 is a view of one of the cutting blades and a section of the shank of the bit. Fig. 6 is a section of the enlarged shank of the bit for securing same on a shaft or a brace.

My bit consists of a shank 3 on one end of which is integrally formed the end cutting edges 4, each having scoring flanges 5 extended therefrom and parallel with the said shank 3. On the body of said shank 3 and placed in a spiral-like position from each other is the side cutting edges 1. On the end opposite the cutting edges 4 is an enlarged threaded portion 3′, internally threaded to receive a threaded portion 8 of a power driven shaft. The set screw 6 is provided in said enlarged portion 3′ for the purpose of securely holding said bit on said shaft 8. On the two end cutters 4 is provided cutting edges 7 at right angles to the axis of the bit. The side cutting edges 1 are positioned in reference to each other in two broken spiral-like wings or lines and alternately placed on the opposite sides of said shank 3 for the purpose of providing a cutting edge on one side or the other of any transverse plane of said shank 3. As thus constructed my bit is especially adapted to bore a circular entering hole. Without removing the bit from the hole, the bit may be moved in a lateral direction at right angles to the hole, thus enlarging said hole in a slotted form to the width desired for a mortise and of uniform depth and width. If at this time the bit is moved in any lateral direction from the hole thus bored a further extension of said slot may be made in any lateral direction. The said holes or similar ones may be made by moving the bit within the material or by moving the material to the bit. I am thus enabled to bore a circular hole or a slotted hole of equal depth throughout and of any longitudinal length to form any angle desired in, or any length mortise.

Having thus described my invention, I desire to secure by Letters Patent and claim:—

1. A mortising auger consisting of a shank; integral cutting blades on one end thereof and at right angle to the axis and alined at said axis; and side cutting members integral with said shank and having equal radii, the cutting edges of which are in lines parallel with said shank and their bodies forming an interrupted spiral column.

2. A mortising auger consisting of a shank; integral cutting blades on one end of said shank and at right angles thereto and in line at the axis; side cutting members integral with said shank all having radii equal to said end cutting blades, the cutting edges of which are in lines parallel with said shank, one of said lines being at the back of said end cutting blades, the following line being at the back of the preceding line that runs to the back of the end cutting blades, each line dropping back the same distance.

In testimony whereof I have affixed my signature in presence of two witnesses.

ORLANDO CRANK.

Witnesses:
BEN L. CORUM,
W. R. WILLIAMS.

Copies of this patent may be obtained for five cents each, by addressing the "Commissioner of Patents, Washington, D. C."